G. WALLACE.
Fermenting Vat.
No. 62,581.
Patented March 5, 1867.
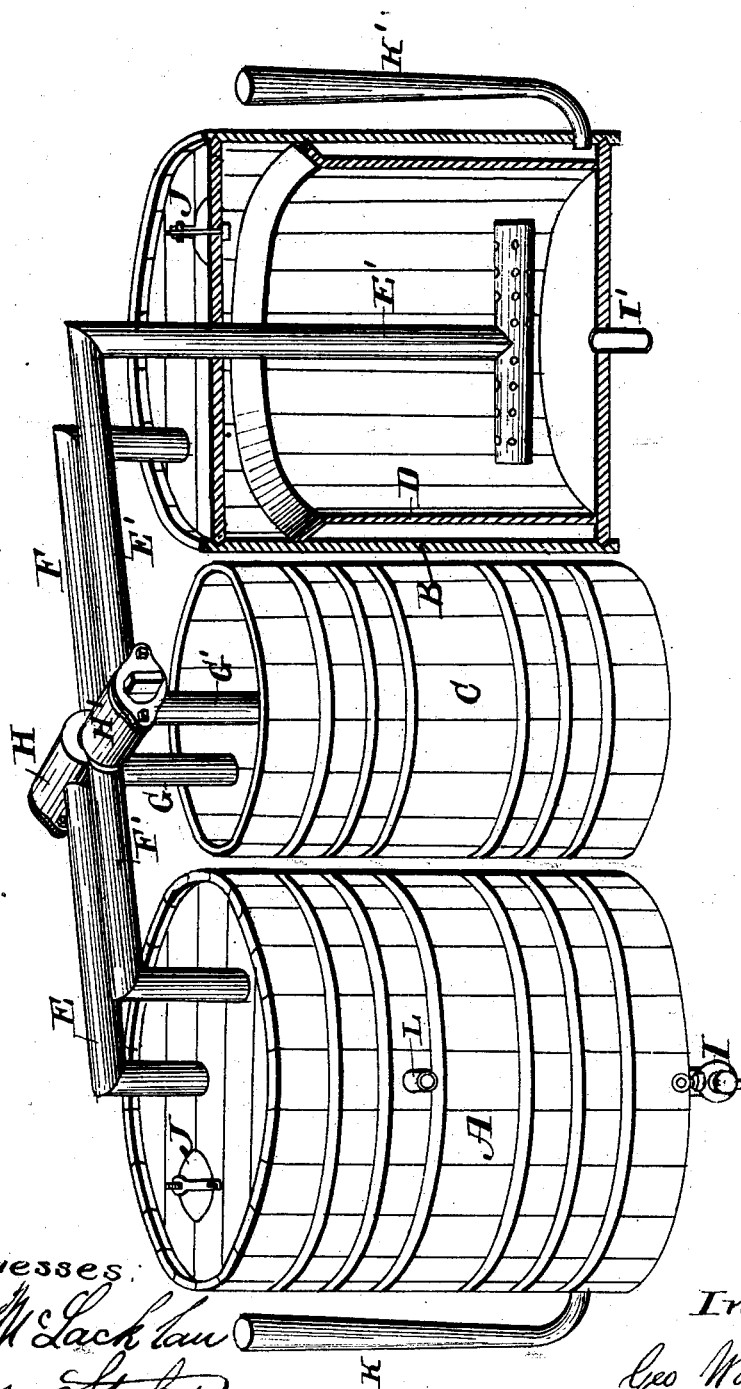
Witnesses
John McLachlan
H. U. Stokes
Inventor:
Geo Wallace

United States Patent Office.

GEORGE WALLACE, OF CINCINNATI, OHIO.

Letters Patent No. 62,581, dated March 5, 1867.

---

IMPROVEMENT IN APPARATUS FOR FERMENTING MALT AND OTHER LIQUORS.

---

The Schedule referred to in these Letters Patent and making part of the same.

---

TO ALL WHOM IT MAY CONCERN:

Be it known that I, GEORGE WALLACE, of the city of Cincinnati, in the county of Hamilton, and State of Ohio, have invented a new and useful Machine for Regulating Vinous Fermentation in Malt and other Liquors; and I do hereby declare that the following is a clear, full, and exact description of the construction and operation of the same, reference being had to the annexed drawings, making a part of this specification, in which—

A is a perspective external view of an air-tight vat or tank. B, a cross-section of a similar vat or tank. C is an open tub or vat, and stands between vats or tanks A and B, and to contain water. Vats or tanks A and B have a tight inside shell or casing, D, allowing a current of water to circulate, which is supplied at pipes K and discharged at pipes L. Pipes, E and F, extend from the crown of each vat or tank, A and B, to near the bottom of the other vat or tank, across the lower end of which is a perforated cross pipe. In the middle of pipes E and F are two-way cocks, H, designed to relieve the vats or tanks A and B of surplus pressure of gases by allowing them to escape through pipes G into vat or tub C, containing water, yet retaining any alcoholic gases that may arise; also to insure an equal fermentation in each vat or tank.

To enable others skilled in the art to make and use my invention, I will proceed to describe its construction and operation.

I construct two large air-tight vats or tanks, as shown by letters A and B, which are filled at manhole J, and drawn off at cock I. Each vat or tank has a tight inner shell or lining extending two-thirds up, between which and the outside shell there is a space, which is to be kept filled with water, which is supplied at pipes K, and discharged at pipes L. This is to insure the proper temperature to the liquor in vats or tanks A and B during fermentation. Between the air-tight vats or tanks A and B, I place an open vat, C, containing water. In the top of each vat A and B comes out a pipe, E and F, which enters the opposite vat or tank, and extends to near its bottom, across the end of which is a perforated cross pipe. In the middle of cross pipes E and F are two-way cocks, H, which insures the regulation of the pressure and gases during fermentation. If one vat is fermenting faster than the other, the surplus gas is discharged in the other vat; or, if each vat has a surplus gas, it is then turned off through pipes G, and allowed to escape in the water in vat or tub C, which prevents alcoholic condensation and the atmosphere from getting into vats or tanks A and B.

Having thus fully described and set forth the nature of my invention, what I claim as my invention, and desire to secure by Letters Patent, is—

1. The water chamber D, by which the temperature of the liquor in vats or tanks, A and B, can be regulated during fermentation.

2. The application of the two-way cock H, by which the fermentation of each vat or tank may be regulated; or, if a surplus amount of gases is generated, allows it to escape through pipes G.

3. The open tubs or vat C, containing water, which allows the non-condensing gases to escape, yet prevents the atmosphere from getting in the vats or tanks, A and B.

GEO. WALLACE.

Witnesses:
 JOHN McLACHLAN,
 F. U. STOKES.